Figure 1:
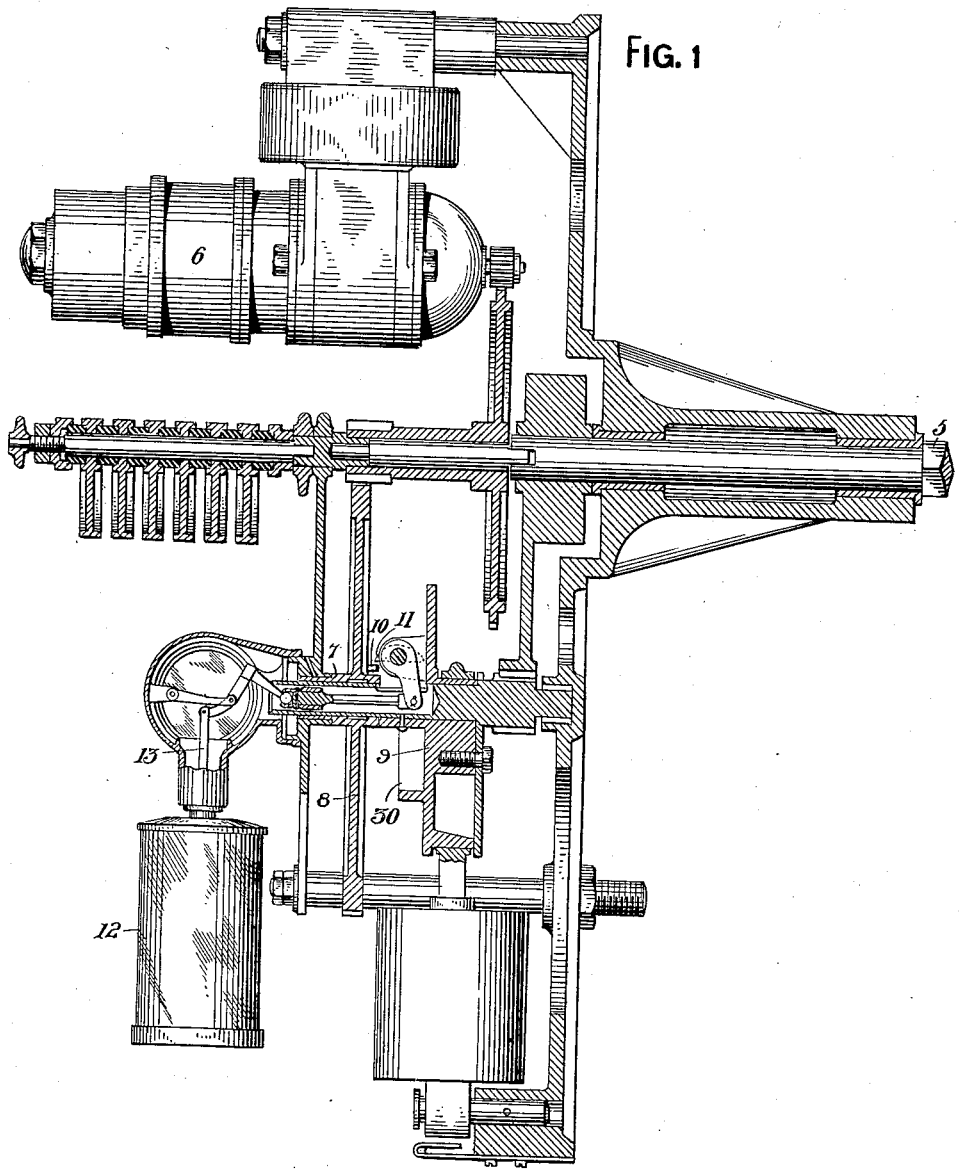

P. UTNE.
CLUTCH CONTROLLING DEVICE.
APPLICATION FILED AUG. 10, 1911.

1,017,825.

Patented Feb. 20, 1912.
2 SHEETS—SHEET 1.

WITNESSES:

INVENTOR.
Per Utne
BY
ATTORNEY.

P. UTNE.
CLUTCH CONTROLLING DEVICE.
APPLICATION FILED AUG. 10, 1911.
1,017,825.
Patented Feb. 20, 1912.
2 SHEETS—SHEET 2.
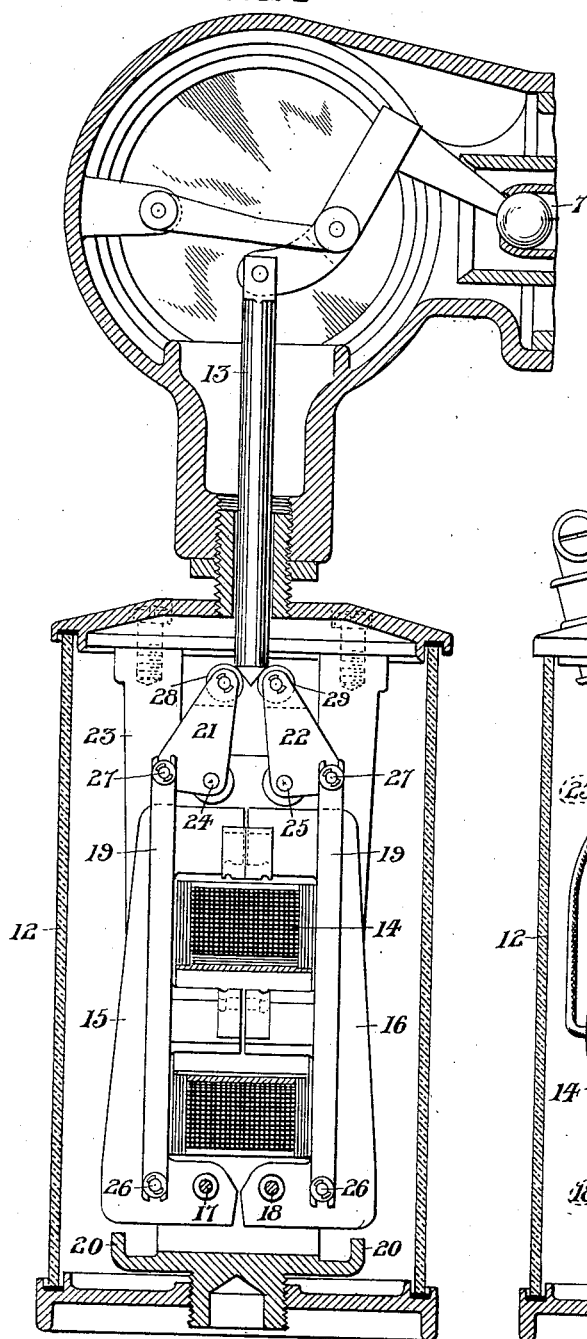
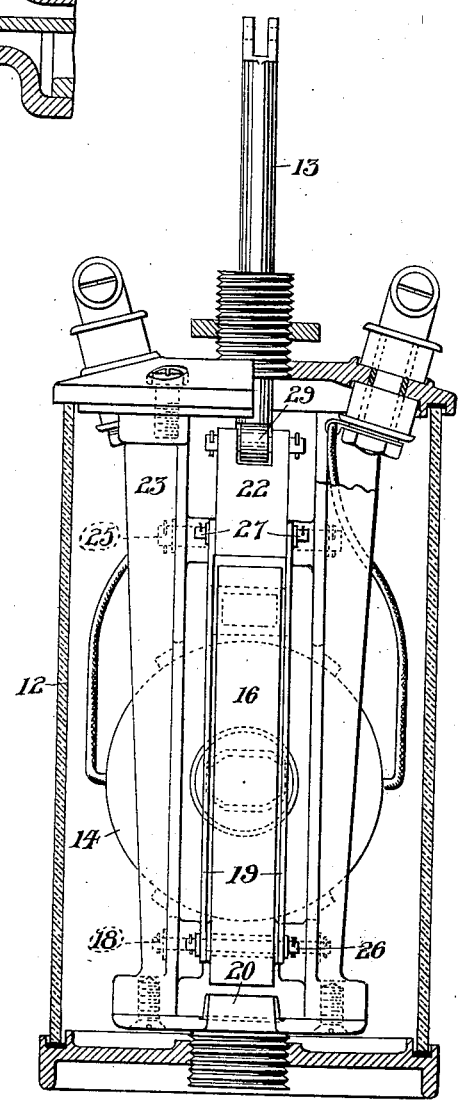
WITNESSES:
INVENTOR.
BY
His ATTORNEY.

UNITED STATES PATENT OFFICE.

PER UTNE, OF EDGEWOOD PARK, PENNSYLVANIA, ASSIGNOR TO THE UNION SWITCH & SIGNAL COMPANY, OF SWISSVALE, PENNSYLVANIA, A CORPORATION OF PENNSYLVANIA.

CLUTCH-CONTROLLING DEVICE.

1,017,825.  Specification of Letters Patent.  Patented Feb. 20, 1912.

Application filed August 10, 1911. Serial No. 643,309.

*To all whom it may concern:*

Be it known that I, PER UTNE, a subject of the King of Norway, and residing at Edgewood Park, in the county of Allegheny and State of Pennsylvania, United States of America, have invented certain new and useful Improvements in Clutch-Controlling Devices, of which the following is a specification.

My invention relates to clutch controlling devices.

I will describe a clutch controlling device embodying my invention, showing its application to a railway signaling device, and will then point out the novel features thereof in claims.

In the accompanying drawings, Figure 1 is a vertical sectional view partly in elevation showing a railway signal device having applied thereto a clutch controlling device embodying my invention. Fig. 2 is a fragmentary view of a portion of the signal device shown in Fig. 1 and showing more in detail the clutch controlling device embodying my invention. Fig. 3 is a side view of the portion of the apparatus shown in Fig. 2.

Similar reference characters refer to similar parts throughout the several views.

Referring particularly to Fig. 1, I have here shown a signal device of the type such as is shown and described in United States Letters Patent No. 994125 granted to John P. Coleman on June 6, 1911. Briefly described this signal device as herein shown comprises a shaft 5 adapted to carry a semaphore or other form of signal, an electric motor 6, and a transmission mechanism intermediate the semaphore shaft and the motor. This transmission mechanism includes a clutch device 7. The clutch device 7, comprises a rotating member 8 operatively connected with the motor 6, a second rotating member 9 independent of the member 8 and operatively connected with the semaphore shaft 5, a stud 10 secured to the member 8, and a movable dog 11 carried by the member 9. The dog 11 is so mounted on the member 9 that it is movable into and out of position for engagement with the stud 10 whereby the two rotatable members 8 and 9 may be either operatively connected or disconnected. The dog 11 is controlled by an electromagnetic device 12.

The dog 11 is moved by a cam device 30 into position for engagement with the stud 10 just before the dog and the stud come into registering position by the rotation of either or both members 8 and 9, and the dog will then be held in this engaging position if the electromagnetic device 12 is energized, or will be moved out of this engaging position by its contact with the stud if the electromagnetic device 12 is deënergized. The control of the dog 11 by the electromagnetic device 12 is effected through the medium of a vertically movable rod 13 the upper end of which is operatively connected with the dog 11 through suitable links and the lower end of which is directly controlled by the electromagnetic device 12.

Referring now particularly to Figs. 2 and 3 the electromagnetic device is here shown as comprising a winding 14, and two swinging armatures 15 and 16 pivotally mounted on a frame 23 at points 17 and 18 respectively. When winding 14 is deënergized the armatures fall apart by gravity until they rest upon stops 20, 20, but when the winding is energized the armatures are drawn together into the positions shown in Fig. 2. These opposite or reverse movements of the armatures 15 and 16 are utilized in controlling the longitudinal movements of the rod 13.

21 and 22 are two movable members operatively connected respectively with the armatures 15 and 16; and each of which members is provided with a suitable surface for engaging with the lower end of rod 13 whereby the rod is held at the upper end of its stroke or permitted to move downwardly from such position according to whether the armatures 15 and 16 are held together or are swung apart. As here shown, the movable members 21 and 22 are pivotally mounted on the frame 23 at points 24 and 25 respectively, and are connected with the armatures 15 and 16 respectively by means of links 19, one link passing downwardly on each side of each armature. These links are pivotally connected with the armatures at points 26 and with the members 21 and 22 at points 27. The upper portion of each of the members 21 and 22 is in the form of a jaw in which is mounted a roller 28 or 29. The lower end of rod 13 is shown as being beveled at a suitable angle on each side (see Fig. 2) to provide bearing surfaces for the rollers 28 and 29.

The parts of the device just described are so proportioned that when the armatures are drawn together into their closed position the rollers 28 and 29 are held in position to engage with the beveled surfaces of the rod 13 and to thereby hold the rod at the upper end of its stroke; but when the armatures are allowed to fall apart (as for example when the winding 14 is deënergized) the rollers will be permitted to be spread apart by the rod 13 so that the rod may pass downwardly between the two rollers to the lower end of its stroke. Although I have herein shown the members 21 and 22 provided with rollers, it is understood that these rollers may be omitted and that the two members may be provided with surfaces suitable to engage with the beveled surfaces of the rod 13. It is also understood that only one movable member 21 or 22 may be employed, and that the other movable member may be replaced by a suitable stationary guide for the rod 13.

The operation of the entire clutch device will now be readily understood. When the dog 11 is moved into position for engagement with the stud 10, the rod 13 is also raised to the upper end of its stroke, and if the winding 14 is then energized the rod 13 will be held in the upper position, holding the dog in engagement with the stud, and thereby coupling the motor 6 with the semaphore shaft 5. When however the winding 14 is deënergized, the downward pressure on the rod 13 caused by the pressure between the dog 11 and the stud 10 will force the rollers 28 and 29 apart thereby allowing the rod to move downwardly; this permits the dog to move out of engagement with the stud, thereby uncoupling the motor and the semaphore shaft.

Although I have herein shown a clutch controlling device embodying my invention applied only to a railway signaling device, I do not wish to be limited to this particular application. Nor do I wish to be limited to the application of a controlling device embodying my invention to the specific type of clutch device herein shown and described. And although I have shown and described only one form of clutch controlling device embodying my invention, it is understood that various changes and modifications may be made therein within the scope of the appended claims without departing from the spirit and scope of my invention.

Having thus described my invention, what I claim is—

1. In combination, a clutch device, a longitudinally movable rod adapted when retained in one position to hold the clutch device in engagement and to permit disengagement of the clutch device when not retained in such position, a movable member adapted to engage with one end of said rod for retaining the rod in position for the engagement of the clutch device, and means for holding the movable member in position for engagement with the end of the rod and for permitting the member to move out of the path of the rod.

2. In combination, a clutch device, a longitudinally movable rod adapted when retained in one position to hold the clutch device in engagement and to permit disengagement of the clutch device when not retained in such position, a movable member adapted to engage with one end of said rod for retaining the rod in position for the engagement of the clutch device and electromagnetic means for holding the movable member in position for engagement with the end of the rod and for permitting the said member to move out of the path of the rod.

3. In combination, a clutch device, a longitudinally movable rod adapted when retained in one position to hold the clutch device in engagement and to permit disengagement of the clutch device when not retained in such position, a surface on said rod forming an angle with the longitudinal axis of the rod, a movable member adapted to engage with the said surface for retaining the rod in position for engagement of the clutch device, and means for holding the movable member in position for engagement with the said surface and for permitting the movable member to move out of such position.

4. In combination, a clutch device, a longitudinally movable rod adapted when retained in one position to hold the clutch device in engagement, and to permit disengagement of the clutch device when not retained in such position, a roller adapted to engage with one end of the rod, and means for holding the roller in position for engagement with the said end of the rod and for permitting the roller to move out of the path of the rod.

5. In combination, a clutch device, a longitudinally movable rod adapted when retained in one position to hold the clutch device in engagement, and to permit disengagement of the clutch device when not retained in such position, a roller adapted to engage with one end of the rod, and electromagnetic means for holding the roller in position for engagement with the said end of the rod and for permitting the roller to move out of the path of the rod.

6. In combination, a clutch device, a longitudinally movable rod adapted when retained in one position to hold the clutch device in engagement and to permit disengagement of the clutch device when not retained in such position, an electromagnetic device comprising two swinging armatures, and means operatively connected with said armatures for controlling the longitudinal movement of the said rod.

7. In combination, a clutch device, a longitudinally movable rod adapted when retained in one position to hold the clutch device in engagement, and to permit disengagement of the clutch device when not retained in such position, two rollers adapted to engage with one end of the rod to retain the rod in the said position, and electromagnetic means for holding the rollers in position for engagement with the end of the rod and for permitting the rollers to move out of such position.

8. In combination, a clutch device, a longitudinally movable rod adapted when retained in one position to hold the clutch device in engagement and to permit disengagement of the clutch device when not retained in such position, one end of said rod being beveled in two intersecting planes, two rollers adapted to bear upon said planes to hold the rod in the said position, and means for holding the rollers in position to bear upon the planes and for permitting the rollers to move out of the path of the rod.

9. In combination, a clutch device, a longitudinally movable rod adapted when retained in one position to hold the clutch device in engagement and to permit disengagement of the clutch device when not retained in such position; and an electromagnetic device comprising two swinging armatures adapted to be closed together or to move apart, and a member operatively connected with each armature and adapted to be moved into or out of position for engagement with one end of the rod according to whether or not the armatures are closed together, whereby the rod is retained in the position for holding the clutch device in engagement or is permitted to move out of such position.

In testimony whereof, I affix my signature in presence of two witnesses.

PER UTNE.

Witnesses:
A. L. VENCILL,
EULALIA HOWARD.

---

Copies of this patent may be obtained for five cents each, by addressing the "Commissioner of Patents, Washington, D. C."